(12) United States Patent
Kohler

(10) Patent No.: US 7,210,922 B1
(45) Date of Patent: May 1, 2007

(54) VALVE PIN OPERATING MECHANISM

(75) Inventor: Darrell G. Kohler, Mesa, AZ (US)

(73) Assignee: Tech Mold, Inc., Tempe, AZ (US)

( * ) Notice: Subject to any disclaimer, the term of this patent is extended or adjusted under 35 U.S.C. 154(b) by 379 days.

(21) Appl. No.: 10/993,010

(22) Filed: Nov. 18, 2004

(51) Int. Cl.
*B29C 45/23* (2006.01)

(52) U.S. Cl. ........................ 425/563; 425/564; 425/566

(58) Field of Classification Search ................ 425/562, 425/563, 564, 565, 566
See application file for complete search history.

(56) References Cited

U.S. PATENT DOCUMENTS

| | | | |
|---|---|---|---|
| 3,679,341 A * | 7/1972 | Graybill et al. | 425/565 |
| 4,681,528 A * | 7/1987 | Maruyama et al. | 425/562 |
| 4,923,387 A * | 5/1990 | Gellert | 425/564 |
| 5,518,389 A | 5/1996 | Nonomura | |
| 6,343,921 B1 | 2/2002 | Kazmer | |
| 2003/0151165 A1 | 8/2003 | Colonico | |
| 2003/0180409 A1 | 9/2003 | Kazmer | |

* cited by examiner

*Primary Examiner*—Tim Heitbrink
(74) *Attorney, Agent, or Firm*—LaValle D. Ptak

(57) ABSTRACT

A hot runner injection molding apparatus includes a manifold for transferring molten plastic into a channel to a mold gate. A valve pin extends at least partially through the channel and is reciprocally movable from a retracted position to an extended position to close the mold gate when the valve pin is in the extended position, and to open the mold gate when the valve pin is in the retracted position. A valve pin moving mechanism is coupled with the valve pin to directly move the valve pin to the extended position; and a resilient coupling is located between the valve pin and the valve pin moving mechanism for normally moving the valve pin to the retracted position.

15 Claims, 4 Drawing Sheets

US 7,210,922 B1

VALVE PIN OPERATING MECHANISM

BACKGROUND

This invention relates to hot runner injection molding apparatus, and in particular, to the operating mechanism for a valve pin in such a molding apparatus.

DETAILED DESCRIPTION

Reference now should be made to drawings, in which the same reference numbers are used throughout the different figures to designate the same or similar components. The embodiment of the invention which is shown in FIGS. 1 through 4 is incorporated into an injection molding apparatus for a multi-cavity mold employing a hot runner manifold with gated nozzles. Such multi-cavity molds typically are used to produce large quantities of molded plastic parts with a relatively high repetition cycle. The molds may have a large number of cavities, for example sixteen to fifty, to simultaneously produce parts from each of the cavities in each cycle of operation of the molding machine. In order to produce parts with minimal gate remnants on them, a valve gate often is employed for each of the different cavities.

Valve gates consist, essentially, of an orifice or small hole through which the molten plastic is introduced into the cavity for producing the desired part. These orifices are closed by means of a precision fitted valve pin, which is moved forward into the orifice to close off the gate and retracted to open the gate for the next cycle of operation.

The opening and closing of the valve gates occurs at very high rates of speed, with operating cycles of several hundred times per hour in a typical multi-cavity mold. Generally, all of the valve gates in a multi-cavity mold are simultaneously activated by a single activation plate which is hydraulically, pneumatically, or mechanically. All of the gates are opened or closed at every cycle. If for some reason it is desirable to disable a particular cavity (which may be producing defective parts, for example), it generally is necessary to close down the entire system and physically remove or alter the pistons which activate the valve pin for the gate associated with the cavity to be disabled.

In many hot runner injection molding devices, separate heating coils are employed in conjunction with each of the channels in the hot runner manifold associated with each different valve gate. This maintains the fluidity of the plastic during the operation of the mold, and the hot plastic typically flows around the valve pin in the region where the valve pin moves into and out of engagement with the gate or orifice for introducing molten plastic into the associated cavity.

Figure 2:
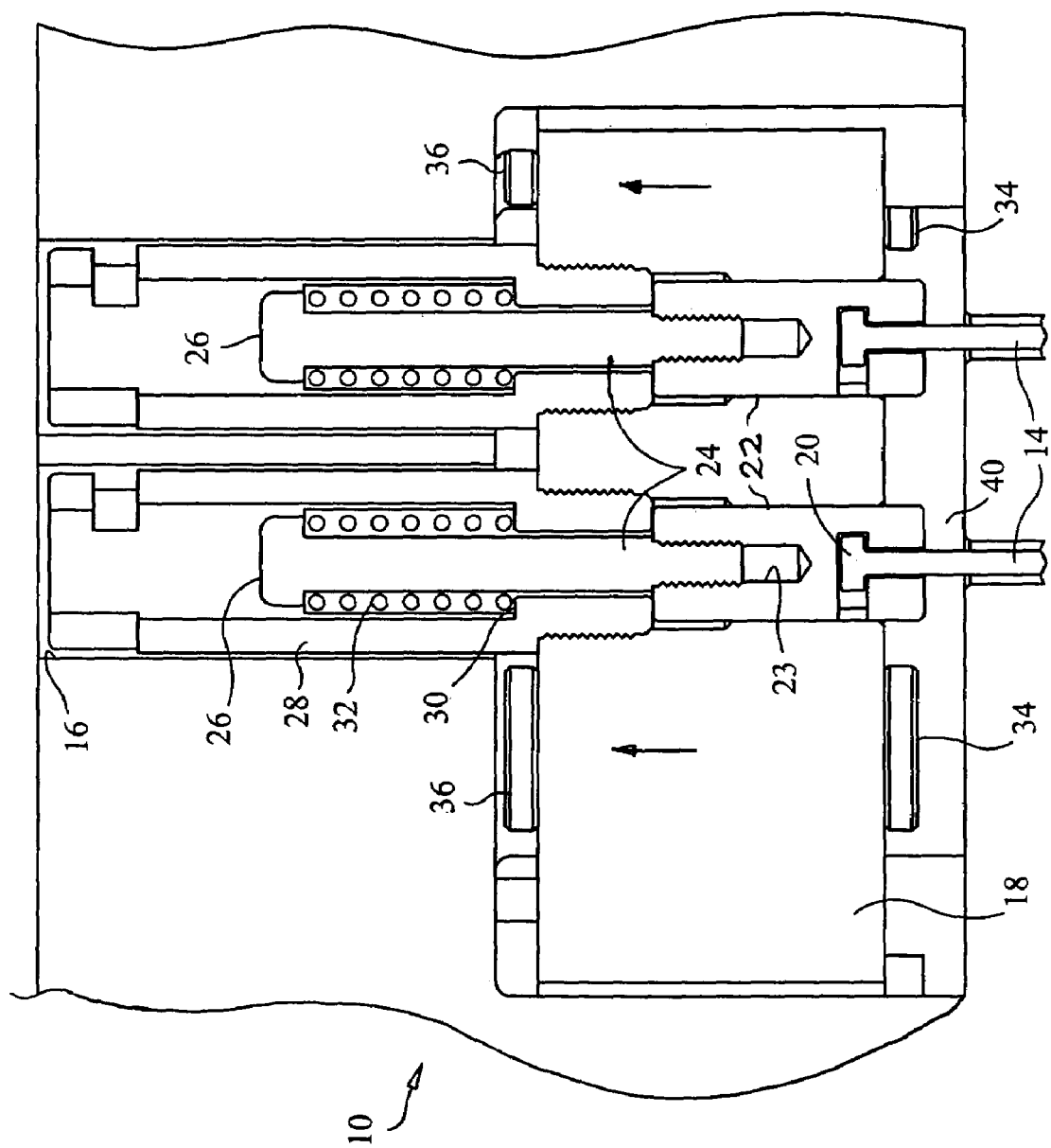
FIG. 2 is a cross-sectional view of a portion of the embodiment shown in FIG. 1 in a first position of operaton.
Figure 3:
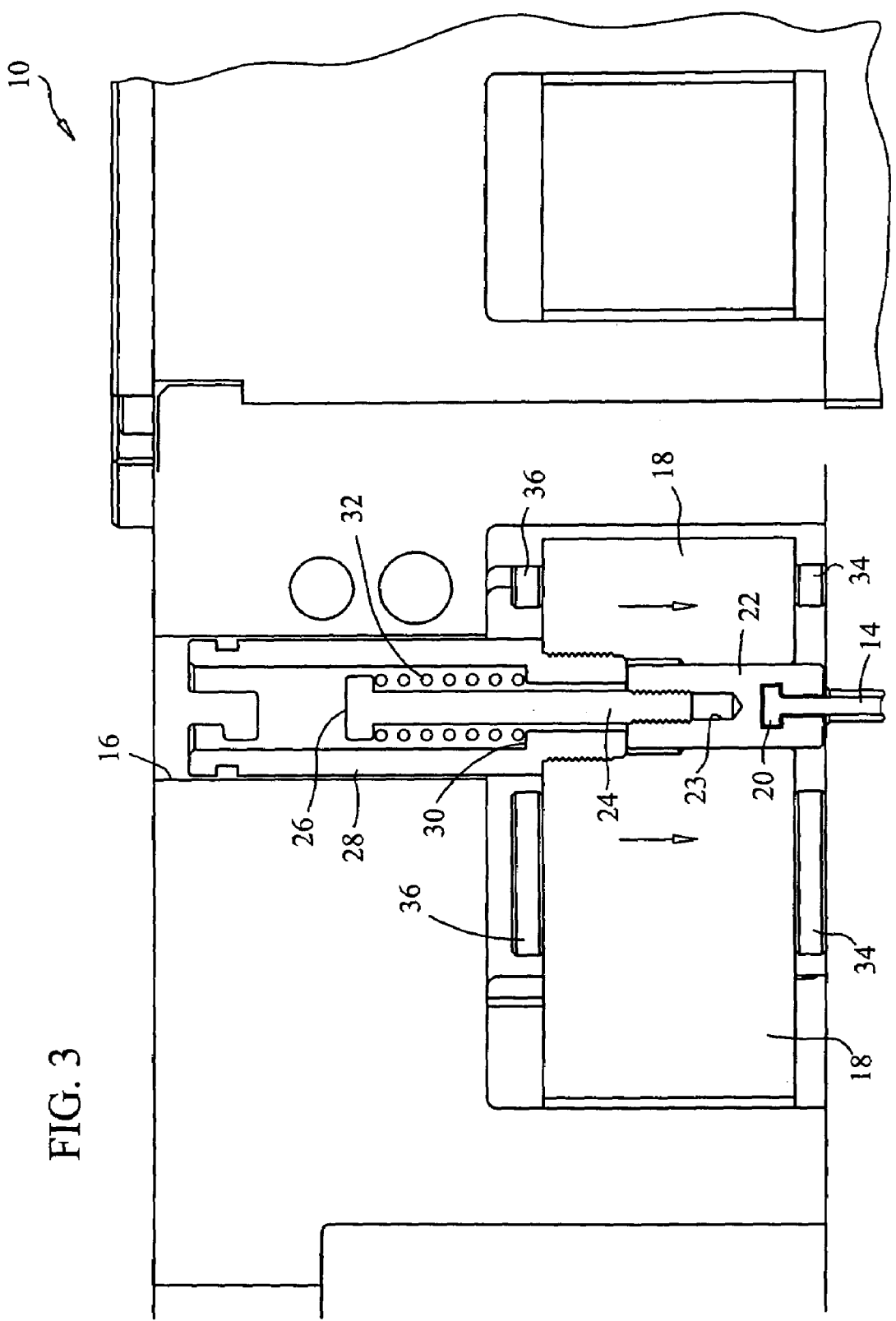
FIG. 3 is a cross-sectional view of a portion of the embodiment shown in FIGS. 1 and 2 in a second position of operation.
Figure 4:
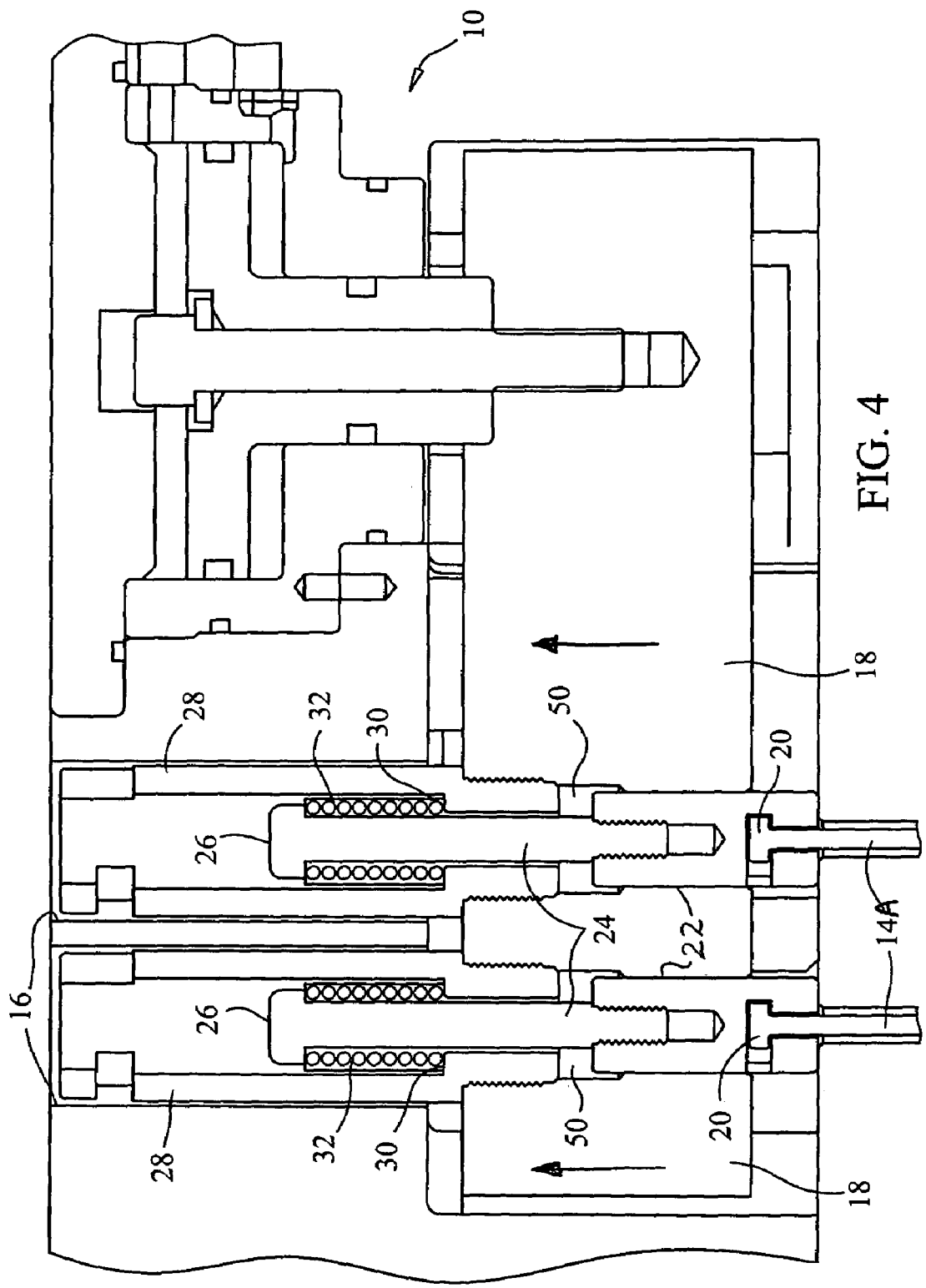
FIG. 4 is a cross-sectional view of a portion of the embodiment shown in FIG. 1 illustrating another feature of the operation of the embodiment of FIG. 1.

The general description which has been given above is typical for many hot runner injection molding machines; and the embodiment of the invention which is disclosed in conjunction with FIGS. 1 through 4 is directed to that portion of a hot runner molding machine which involves the operation of the reciprocal movement of the valve pins for the valve gates in such a machine. Since other components of the machine with which the embodiment of FIGS. 1 through 4 are used are conventional, those components have not been disclosed in order to avoid unnecessary cluttering of the drawings. It is to be understood, however, that the operation of such a machine including the supply of plastic to the machine, the dividing of the melt and the individual heating coils for each of the channels for supplying plastic to the valve gate are standard. The hydraulic, pneumatic or mechanical operation of the reciprocal movement of an activation plate for opening and closing the valve gates also is standard. The right-hand portion of FIG. 4 diagrammatically illustrates a hydraulic or pneumatic control for such an activation plate 18; but the manner in which the activation plate 18 is reciprocally moved within the mold apparatus 10 is conventional and may be of any suitable type desired by a particular machine manufacturer.

Figure 1:
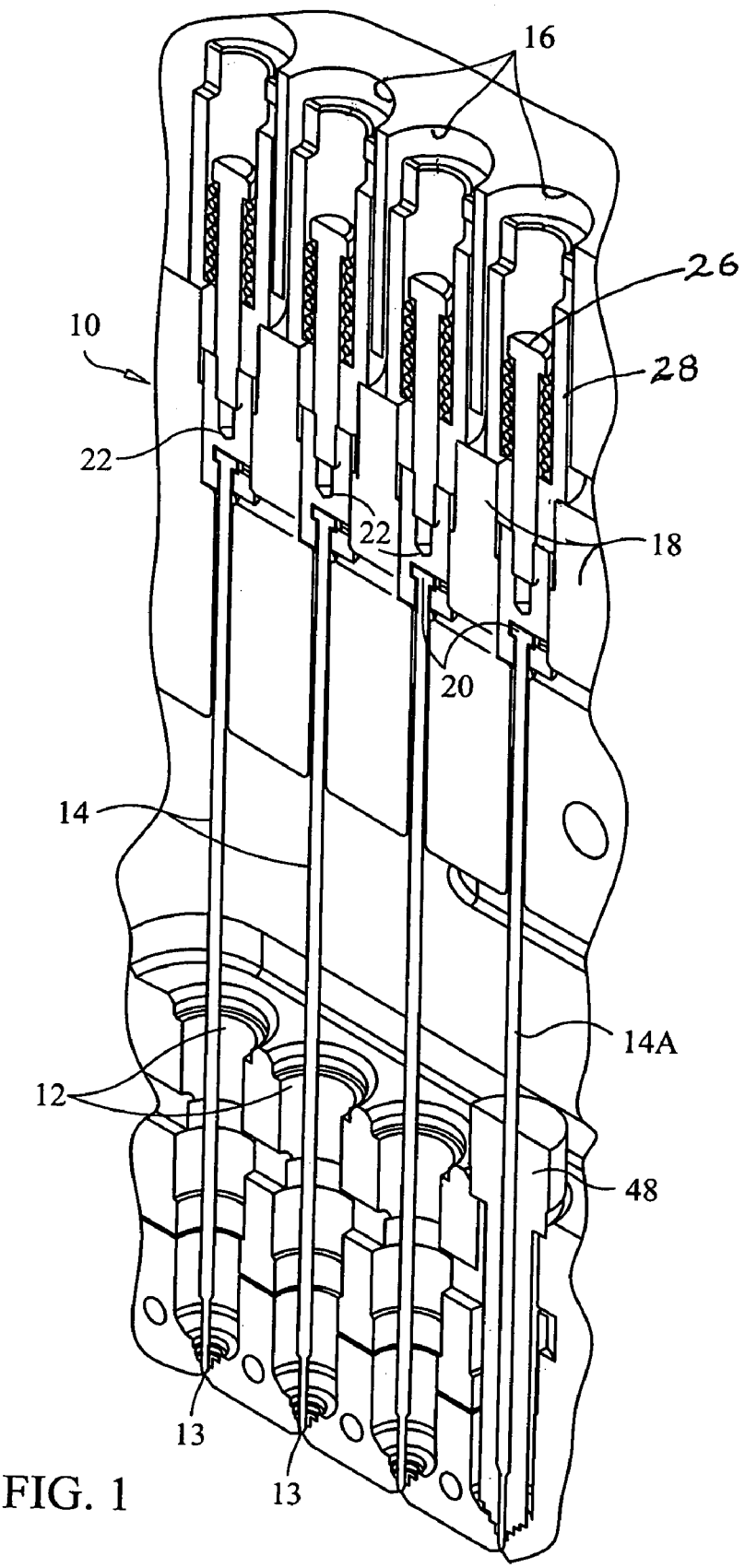
FIG. 1 is a partially cut-away front perspective view of an embodiment of the invention.

FIG. 1 illustrates a partially cut-away perspective view of a portion of four channels of a hot runner injection molding apparatus illustrating the operation of such an apparatus to supply molten plastic to valve gate orifices 13 under the control of the reciprocal operation of valve pins 14 moving through individual channels 12 associated with each of the valve pins 14 to supply molten plastic to mold cavities (not shown) located beneath the orifices or openings 13 associated with each of the cavities of the mold. It should be noted that while FIG. 1 shows four channels of a multi-cavity mold, the number of channels and cavities may be less than four, or greater than four (for example, sixteen to fifty as described above). The operation of each individual valve pin 14, however, is the same throughout the entire multi-cavity mold.

FIG. 1 shows parts associated with four cavities, while FIGS. 2 and 4 show parts associated with two cavities; and FIG. 3 shows parts associated with only a single cavity. The operation is the same for each cavity, however many cavities are employed in a particular molding apparatus.

In FIGS. 1 through 4, an activation plate 18 is located in the molding apparatus for reciprocal movement (vertically, as shown in FIGS. 1 through 4), upward and downward, to open and close the valve gates or orifices 13 by means of the retraction and extension of the valve pins 14 passing through the individual channels 12 associated with each of the valve gates 13. The mechanism for moving this activation plate 18 between its uppermost and lowermost positions is diagrammatically shown in the right-hand portion of FIG. 4; but no specific reference is made to that portion, since that operation is standard in whatever molding apparatus the embodiment of FIGS. 1 through 4 may be used. As mentioned previously, such reciprocal movement of an activation plate in multi-cavity hot runner molds may be accomplished in a variety of different ways.

FIGS. 1 and 2 illustrate the interconnections between the activation plate 18 and the shafts 14a of the valve pins 14 to control the reciprocal retraction and extension of the valve pins into the valve gate orifices 13. A sleeve 28, having a cylindrical configuration and having a hollow interior cylindrical shape, is threaded into the activation plate 18 for each of the valve pin shafts 14 to reciprocally move within an associated cylindrical aperture 16 in the block of the mold 10. The bottom of each sleeve 28 comprises a shoulder which rests on top of a corresponding connector 22, also preferably of a cylindrical configuration. Each connector 22 has a slot in it for carrying the T-shaped top 20 of a corresponding valve pin 14, as shown most clearly in FIG. 1, and also shown clearly in FIGS. 2 through 4.

The bottoms of each of the sleeves 28 are open and have a valve pin extension member 24 passing through them and threaded into a recess 23 in the corresponding connector 22 to partially compress a coil spring 32 between a shoulder 30 on the inside of each of the sleeves 28, and a corresponding shoulder 26 located at the top of each of the members 24. The spring 32 is illustrated as a compression coil spring which surrounds the corresponding cylindrical extension member 24.

Each spring 32 is under some compression when it is in its relaxed or normal state of operation, with the component parts having the relative positions shown in FIG. 2. In this position of operation, the top surface of each connector 22 is in direct contact with the bottom of the corresponding sleeve 28 to form a metal-to-metal contact. Similarly, there is metal-to-metal contact between the T-shaped top 20 of the valve pin 14 and the connector 22; so that when the activation plate 18 is moved to its downward position to drive the valve pin 14 into the valve gate orifice 13, a direct or solid steel-on-steel contact is made throughout the entire assembly. This is readily apparent from an examination of FIG. 3.

When the activation plate 18 is moved upward in the direction of the arrows shown in FIG. 2 to lift the valve pins 14 upward to open the valve gates at the orifices 13, the normal operation is with the parts in the relative positions shown in FIG. 2. All of the metal-to-metal contact mentioned above remains. The compression force of the spring 32 is selected to be such that it is greater than the frictional forces between the pins 14 and the molten plastic in the pin guides or channels 12. In this position of operation, the pins 14 are pulled upward to the retracted position, leaving a space 40 between the bottom of the connectors 22 and the top of the mold machine assembly located immediately below the activation plate. The upper limits of movement for the activation plate 18 are established by blocks 36; and its lower limits of movement are established by blocks 34, as illustrated in FIGS. 2 and 3.

When the injection of molten plastic into the cavities has been completed, the activation plate 18 again is moved downwardly in the direction of the arrows shown in FIG. 3 to drive the valve gate pins 14 in a tight metal-to-metal direct movement, with all of the parts in contact as shown in FIG. 3, to close the various orifices 13. The cycle of moving the activation plate 18 back and forth between the position shown in FIG. 2 and the position shown in FIG. 3 is continuously repeated. So long as all of the molded articles are of a quality to pass inspection and so long as no leakage or dripping of molten plastic from a closed valve gate 13 takes place, this is the operation which continuously occurs.

Occasionally, however, a defective part is produced in one or more of the cavities of a large multi-cavity mold. In such a case, it is desirable to be able to discontinue making parts from such a cavity until some later time when the mold machine is turned off for repair or is otherwise idle to allow the repair or replacement of parts necessary to operate the machine with all of the cavities producing parts. For large multi-cavity machines, it is highly desirable to be able to turn off a defective cavity "on the fly" requiring little or no down time of the machine, while still allowing it to produce parts from those cavities which are properly functioning. For example, if one cavity out of a 20 cavity machine should somehow become defective for any reason, it is desirable to be able to turn off only that cavity and prevent defective parts from being made therein from one cycle to another, or within a very few cycles of the machine, without stopping the operation of the machine to accomplish this purpose.

As mentioned previously, many multi-cavity hot runner machines employ separate heating coils for the sleeves or channels which surround the valve pins in order to effectively control the temperature of the plastic at the point where it is delivered into the cavity. This is a standard procedure in many machines, and for that reason, the details of the heating coils and the controls for these heating controls are not illustrated in the drawings. The machine which is illustrated, however, is employed in conjunction with such individually controlled heating coils around each of the pin guide channels 12.

Reference now should be made back to FIG. 1, where the right-hand channel 12 is shown filled with solidified plastic 48. This is representative of a pin guide channel where the heating coil has been turned off to allow the plastic in the sleeve or pin guide 12 to harden around the shaft of the corresponding valve pin identified as valve pin shaft 14A in FIG. 1. If a defective cavity is determined upon inspection of parts produced by a machine, the heating coil for the channel 12 for that cavity is turned off; and the plastic 48 is allowed to solidify, as diagrammatically illustrated in FIG. 1. This plastic then freezes around the shaft 14A of the valve pin associated with it to produce high friction to hold the valve pin 14 in its downward or closed position of operation.

On the next cycle of operation of the activation plate 18 to its upward position, as illustrated in FIG. 4, the connector 22 which is secured to the T-shaped top 20 of the assocaited valve pin 14A is held in its downward position by the friction of the solidified plastic 48 (shown in FIG. 1). The activation plate 18, however, continues to move in the upward direction shown in FIG. 4, to its uppermost position comparable to the position shown in FIG. 2. The sleeve 28 for the pin or pins 14A, however, moves upwardly, compressing the spring 32 between the shoulder 30 on the inside of the sleeve 26 and the shoulder 26. This produces a gap 50 which is equal to the gap 40 described previously. Continued operation of the activation plate in its reciprocal movement, as illustrated in FIGS. 1 and 2, takes place for the remainder of the cavities associated with normal or non-frozen valve pins 14, while at the same time the spring force of the springs 32 for the captivated or frozen valve pins 14 is less than the frictional force between the hardened plastic and the valve pin shafts 14A. Thus, the springs 32 associated with a captivated or closed valve pin 14 alternately compress in the retracted position and extend when the activation plate 18 moves to the extended position without requiring any physical shutdown or intervention whatsoever in conjunction with the operation of the machine. The only difference is that the heating coil power is removed from the cavity where the valve pin 14 is to remain in its extended position to close the gate orifice 13 of the associated valve gate.

The foregoing description of an embodiment of the invention is to be considered as illustrative and not as limiting. For example, while a coil spring 32 has been illustrated as the resilient coupling between the valve pin and the activation plate for moving the valve pin to its retracted position, other resilient interconnections could be provided as well. Various other changes and modifications will occur to those skilled in the art for performing substantially the same function, in substantially the same way, to achieve substantially the same result, without departing from the true scope of the invention as defined in the appended claims.

What is claimed is:

1. A hot runner injection molding apparatus including a manifold for transferring molten plastic into a channel to a mold gate, the apparatus including in combination: a valve pin extending at least partially through the channel and reciprocally movable from a retracted open position to an extended closed position to close the mold gate when the valve pin is in the extended position and to open the mold gate when the valve pin is in the retracted position; a valve pin moving mechanism coupled with the valve pin to directly move the valve pin to the extended position; and a resilient coupling for normally moving the valve pin to the retracted position thereof.

2. An injection molding device according to claim 1 wherein the force of the resilient coupling exceeds the frictional force between the valve pin and the channel when molten plastic is in the channel and is insufficient to overcome the frictional force between the valve pin and the plastic in the channel when the plastic in the channel is solidified.

3. The injection molding apparatus according to claim 2 wherein the resilient coupling comprises a spring member.

4. An injection molding apparatus according to claim 3 wherein the spring member comprises a compression spring.

5. An injection molding apparatus according to claim 4 wherein the compression spring is a coil spring with first and second ends, and the valve pin moving mechanism has a shoulder thereon for engaging the first end of the coil spring, the valve pin moving mechanism further having an extension thereon passing through the coil spring with a shoulder on the extension for engaging the second end of the coil spring.

6. An injection molding apparatus according to claim 5 wherein the valve pin moving mechanism includes an activation plate.

7. An injection molding apparatus according to claim 1 wherein the valve pin moving mechanism includes an activation plate.

8. An injection molding device according to claim 7 wherein the force of the resilient coupling exceeds the frictional force between the valve pin and the channel when molten plastic is in the channel and is insufficient to overcome the frictional force between the valve pin and the plastic in the channel when the plastic in the channel is solidified.

9. The injection molding apparatus according to claim 1 wherein the resilient coupling comprises a spring member.

10. An injection molding apparatus according to claim 9 wherein the spring member comprises a compression spring.

11. An injection molding apparatus according to claim 9 wherein the compression spring is a coil spring with first and second ends, and the valve pin moving mechanism has a shoulder thereon for engaging the first end of the coil spring, the valve pin moving mechanism further having an extension thereon passing through the coil spring with a shoulder on the extension for engaging the second end of the coil spring.

12. A hot runner injection molding apparatus including a manifold for transferring molten plastic into a channel to a mold gate, the apparatus including in combination: an activation plate in the molding apparatus for reciprocal movement between first and second positions; a sleeve having a hollow interior attached to the activation plate for movement therewith; a valve pin connector member mounted at least in part for reciprocal movement within the sleeve; a spring member located between the valve pin connector member and a portion of the sleeve for normally biasing the connector member to a predetermined position within the sleeve; a valve pin assembly attached to the valve pin connector member and including a valve pin extending at least partially through the channel and reciprocally movable from a retracted position to an extended position to close the mold gate when the valve pin is in the extended position and to open the mold gate when the valve pin is in the retracted position.

13. An injection molding apparatus according to claim 12 wherein the sleeve has a lower end and the valve pin connector member has an upper end normally abutting the lower end of the sleeve.

14. The injection molding device according to claim 13 wherein the spring member is a coil spring placed in compression between the valve pin connector member and the portion of the sleeve to cause the lower end of the sleeve and the upper end of the valve pin connector member to normally be held in abutting contact with one another.

15. An injection molding device according to claim 14 wherein the force of the resilient coupling exceeds the frictional force between the valve pin and the channel when molten plastic is in the channel and is insufficient to overcome the frictional force between the valve pin and the plastic in the channel when the plastic in the channel is solidified.

* * * * *